US009967855B2

(12) United States Patent
Kotecha et al.

(10) Patent No.: US 9,967,855 B2
(45) Date of Patent: May 8, 2018

(54) MULTICAST DELIVERY OF NETWORK CONGESTION INFORMATION

(71) Applicant: Verizon Patent and Licensing Inc., Arlington, VA (US)

(72) Inventors: Lalit R. Kotecha, San Ramon, CA (US); Rakesh Chandwani, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 131 days.

(21) Appl. No.: 14/840,993

(22) Filed: Aug. 31, 2015

(65) Prior Publication Data
US 2017/0064602 A1   Mar. 2, 2017

(51) Int. Cl.
*H04W 64/00*   (2009.01)
*H04W 36/00*   (2009.01)
*H04W 28/02*   (2009.01)
*H04L 12/18*   (2006.01)
*H04W 36/14*   (2009.01)

(52) U.S. Cl.
CPC ........ *H04W 64/003* (2013.01); *H04L 12/189* (2013.01); *H04W 28/0284* (2013.01); *H04W 28/0289* (2013.01); *H04W 36/0061* (2013.01); *H04W 36/14* (2013.01)

(58) Field of Classification Search
None
See application file for complete search history.

(56) References Cited

U.S. PATENT DOCUMENTS

2013/0272132 A1* 10/2013 Heo ............. H04W 28/02
  370/236.2
2014/0036676 A1*  2/2014 Purnadi ........ H04W 36/0055
  370/235

* cited by examiner

*Primary Examiner* — Brandon M Renner
*Assistant Examiner* — Jay L Vogel

(57) ABSTRACT

A device may receive network congestion information relating to one or more connections. The network congestion information may identify respective utilizations of the one or more connections. The one or more connections may be associated with one or more access points. The device may cause the network congestion information to be provided to a set of user equipments (UEs) via a multicast transmission to cause one or more UEs, of the set of UEs, to switch from a first connection, of the one or more connections, to a second connection, of the one or more connections, based on the network congestion information. The one or more UEs may be connected to a network via a multicast connection.

20 Claims, 5 Drawing Sheets

MULTICAST DELIVERY OF NETWORK CONGESTION INFORMATION

BACKGROUND

A user equipment (UE) may connect to a network via an access point, such as a base station, an eNodeB, a wireless local area network (WLAN) access point (e.g., a Wi-Fi access point), or the like. The UE may experience degraded network performance and/or may disconnect from the network when network congestion associated with a connection to the access point satisfies a network congestion threshold. The network congestion threshold may be satisfied when a threshold quantity of UEs attempt to utilize the same access point for network connectivity.

DETAILED DESCRIPTION OF PREFERRED EMBODIMENTS

Figure 1:
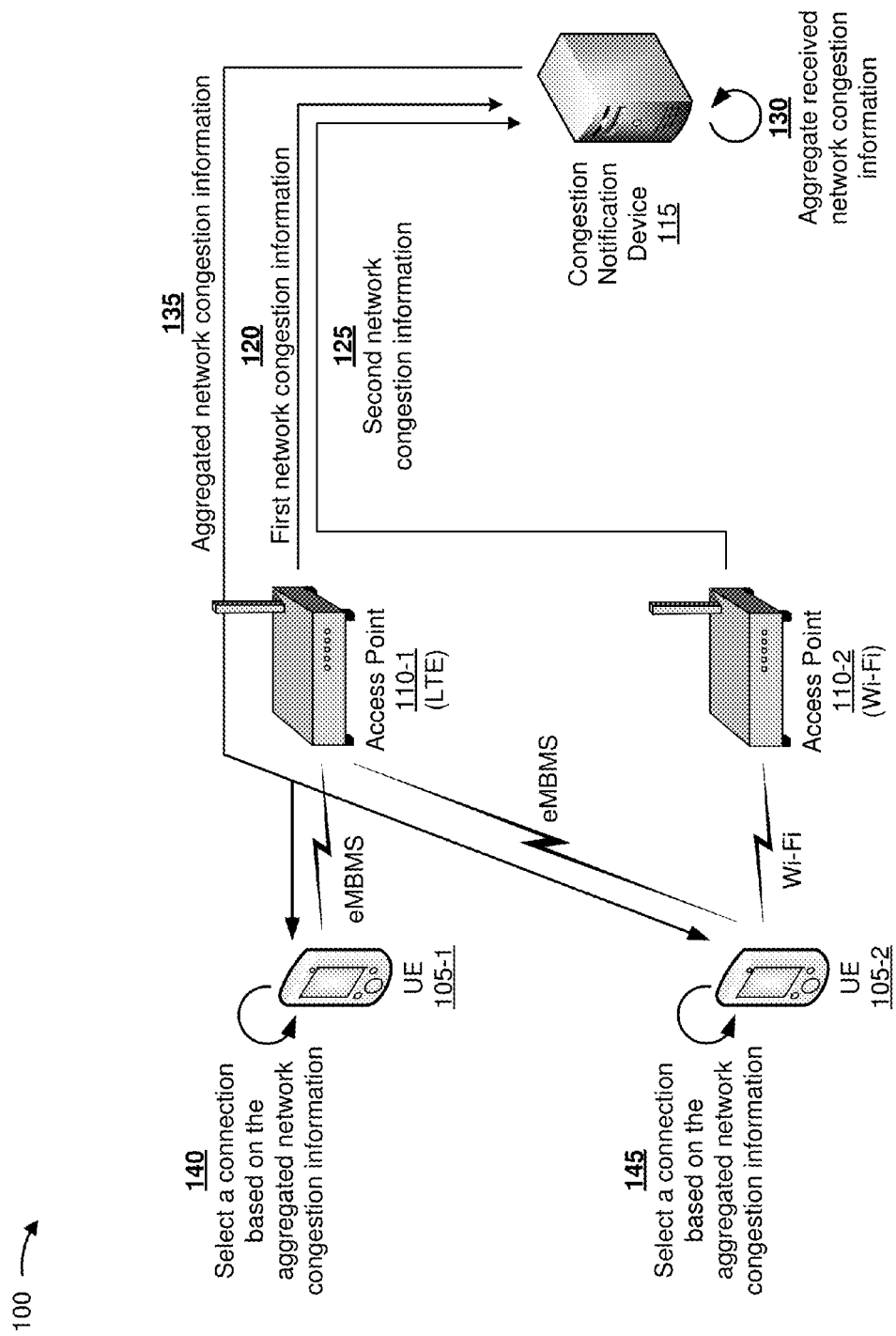
FIG. 1 is a diagram of an overview of an example implementation described herein.

The following detailed description of example implementations refers to the accompanying drawings. The same reference numbers in different drawings may identify the same or similar elements.

A user equipment (UE) may be capable of utilizing multiple different radio access technologies (RATs) for accessing a network. For example, the UE may utilize a long term evolution (LTE) connection, a code division multiple access (CDMA) connection, a wireless local area network (WLAN) connection (e.g., a Wi-Fi connection), or the like. The UE may utilize one or more different bands of a particular RAT for obtaining access to a network. For example, the UE may utilize an LTE 700 band connection (e.g., a connection utilizing the 700 megahertz (MHz) band), an LTE advanced wireless services (AWS) band connection, or the like.

The UE may utilize a unicast connection (e.g., a connection for transmitting messages to and/or from a single network address), a multicast connection (e.g., a connection for receiving messages transmitted concurrently to multiple network addresses), or the like. For example, the unicast connection may be utilized for traffic that is unique to a single UE, such as Internet browsing, email messaging, or the like, and the multicast connection may be utilized for traffic that is shared by multiple UEs, such as streaming video content, streaming audio content, or the like. As an example, multiple users at a stadium may utilize multiple UEs to view a multicast transmission of a video replay of an event at the stadium. In this case, utilization of a single multicast connection may reduce network congestion relative to providing the video replay via multiple unicast connections.

In some cases, a UE may utilize both a unicast connection and a multicast connection, such as to receive application data and streaming video. For example, the UE may receive application data via the unicast connection and streaming video via the multicast connection. When network congestion associated with a particular connection (e.g., a particular frequency band, a particular access point, or the like) satisfies a threshold, a particular UE may be caused to changeover from a first unicast connection to a second unicast connection. This may cause the particular UE to be disconnected from the multicast connection, thereby causing an interruption to the streaming video.

Implementations, described herein, may utilize a multicast connection to provide network congestion information regarding one or more potential connections (e.g., one or more frequency bands, one or more RATs, etc.). In this way, a congestion notification device reduces a likelihood that a UE establishes and/or utilizes a unicast connection via an access point for which network resources are not available for allocation. Moreover, the congestion notification device reduces a likelihood that a UE is disconnected from a multicast connection, improves user experience, and improves load balancing of a network relative to a network for which load balancing is not performed.

FIG. 1 is a diagram of an overview of an example implementation 100 described herein. FIG. 1 shows an example of providing network congestion information and utilizing the network congestion information to select a connection with which to access a network.

As shown in FIG. 1, a first UE 105-1 may connect to a network via an evolved multimedia broadcast multicast service (eMBMS) connection with a first access point 110-1. A second UE 105-2 may connect to the network via an eMBMS connection with the first access point 110-1 and a WLAN connection with a second access point 110-2 (e.g., a Wi-Fi access point). UE 105-1 and UE 105-2 may receive streaming video, multicast via the eMBMS connections. UE 105-2 may utilize the WLAN connection to provide and/or receive other information, such as information associated with an e-mail application, information associated with a mapping application, or the like. A congestion notification device 115 may be connected to access point 110-1, access point 110-2, or the like.

As further shown in FIG. 1, and by reference number 120, access point 110-1 may provide first network congestion information to congestion notification device 115. As shown by reference number 125, access point 110-2 may provide second network congestion information to congestion notification device 115. Network congestion information may include information regarding utilization of network resources available to a particular access point 110 (e.g., averaged over a particular duration of time), information identifying the particular access point 110 (e.g., a media access control (MAC) address, an Internet protocol (IP) address, a service set identifier (SSID), etc.), information identifying a bandwidth associated with the particular access point 110, information identifying a quantity of UEs 105 connected to the particular access point 110, or the like.

As further shown in FIG. 1, and by reference number 130, congestion notification device 115 aggregates the first network congestion information and the second network congestion information to generate aggregated network congestion information. As shown by reference number 135, congestion notification device 115 provides the aggregated network congestion information to UE 105-1 and UE 105-2 via the eMBMS connections with access point 110-1 (e.g., a portion of the same eMBMS connection as is utilized for providing streaming content). In this way, congestion notification device 115 provides the aggregated network congestion information with a reduced network resource utilization relative to utilizing multiple unicast transmissions to provide the aggregated network congestion information. Moreover, based on an eMBMS signal being multicast to UEs 105 within a particular proximity of access point 110-1, congestion notification device 115 increases a likelihood that the aggregated network congestion information relates to network connections to which the UEs 105 are capable of connecting (e.g., based on the aggregated network congestion information being related to access points 110 within a particular geographic region that includes access point 110-1).

As further shown in FIG. 1, and by reference number 140, UE 105-1 may select a connection to utilize for obtaining access to a network based on the aggregated network congestion information. For example, UE 105-1 may continue utilizing access point 110-1. Alternatively, UE 105-1 may handover to access point 110-2. Alternatively, UE 105-1 may handover to another band of LTE associated with access point 110-1.

Similarly, as shown by reference number 145, UE 105-2 may select a connection to utilize based on the aggregated network congestion information. In this way, UEs 105 utilize the aggregated network congestion information to select an access point and/or RAT for accessing a network, thereby facilitating load balancing of the network, reduced network congestion, reduced likelihood of being disconnected from the network, or the like.

Figure 2:
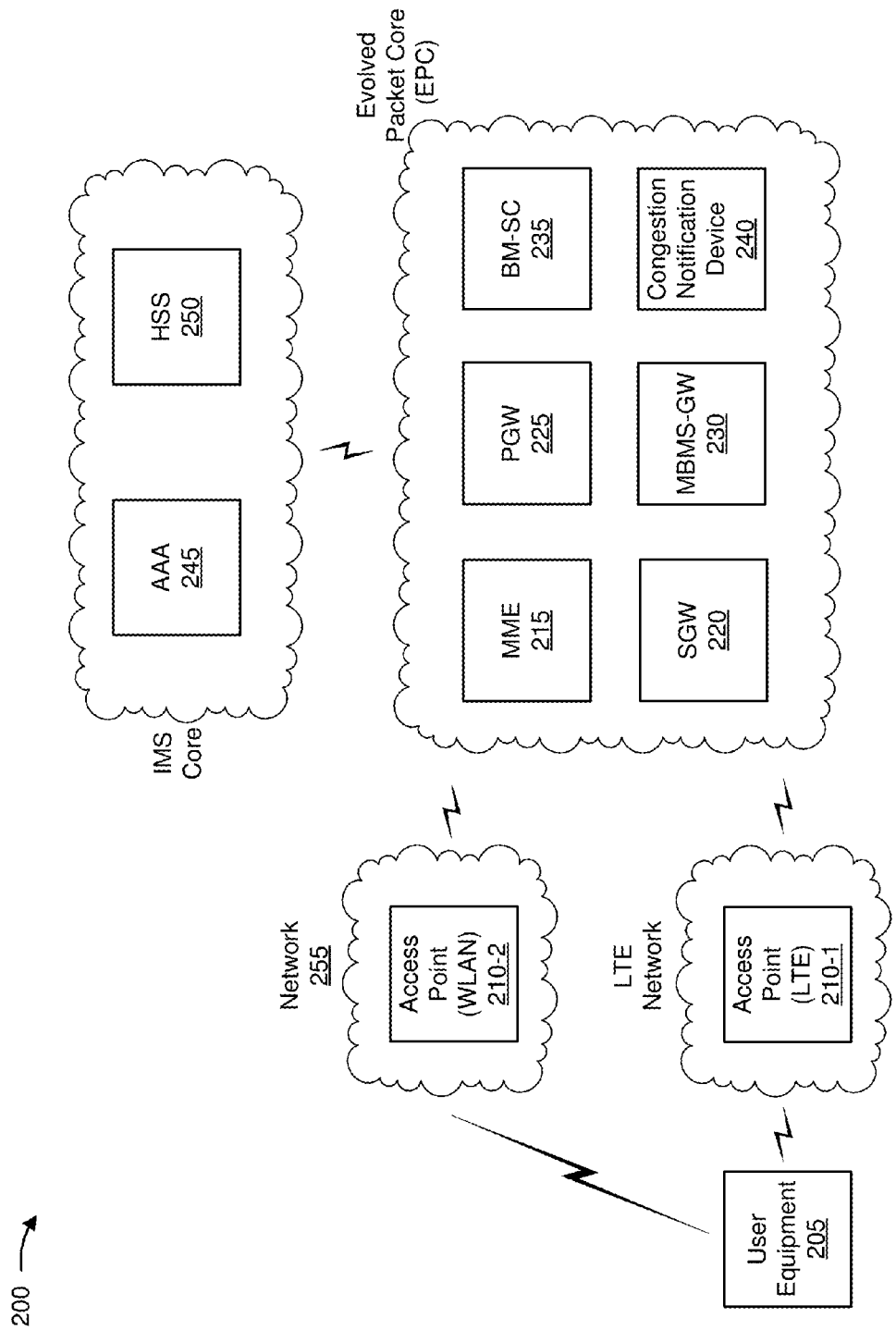
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a UE 205; a set of access points 210 (e.g., LTE access point 210-1, WLAN access point 210-2, etc.); a mobility management entity device (MME) 215; a serving gateway (SGW) 220; a packet data network gateway (PGW) 225; a multimedia broadcast multicast service gateway (MBMS-GW) 230; a broadcast multicast service center (BM-SC) 235; a congestion notification device 240; an authentication, authorization, and accounting server (AAA) 245; a home subscriber server (HSS) 250; and a WLAN 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more access points 210 that take the form of evolved Node Bs (eNBs) via which UE 205 communicates with the EPC. The EPC may include MME 215, SGW 220, PGW 225, MBMS-GW 230, BM-SC 235, and/or congestion notification device 240 that enable UE 205 to communicate with a network and/or an Internet protocol (IP) multimedia subsystem (IMS) core. The IMS core may include AAA 245 and/or HSS 250, and may manage device registration and authentication, session initiation, etc., associated with UEs 205. AAA 245 and/or HSS 250 may reside in the EPC and/or the IMS core.

UE 205 may include one or more devices capable of communicating with access point 210. For example, UE 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. In some implementations, UE 205 corresponds to UE 105-1 and/or UE 105-2 shown in FIG. 1. UE 205 may send traffic to and/or receive traffic from an LTE network (e.g., via LTE access point 210-1), WLAN 255 (e.g., via WLAN access point 210-2), or another network via another type of access point 210.

Access point 210 may include one or more devices capable of transferring traffic, such as audio, video, text, and/or other traffic, destined for and/or received from UE 205. In some implementations, access point 210 may include an eNB associated with the LTE network that receives traffic from and/or sends traffic to a network via SGW 220 and/or PGW 225. Additionally, or alternatively, one or more access points 210 may be associated with a RAN that is not associated with the LTE network, such as a WLAN access point 210 associated with a Wi-Fi connection, a 3G access point 210 associated with a 3G connection, or the like. Access point 210 may send traffic to and/or receive traffic from UE 205 via an air interface. In some implementations, access point 210 may utilize multiple frequency bands for providing network connectivity. For example, an LTE access point 210 may utilize a 700 MHz band frequency, an AWS band frequency, or the like. In some implementations, access point 210 corresponds to access point 110-1 and/or access point 110-2 shown in FIG. 1.

MME 215 may include one or more devices, such as one or more server devices, capable of managing authentication, activation, deactivation, and/or mobility functions associated with UE 205. In some implementations, MME 215 may perform operations relating to authentication of UE 205. Additionally, or alternatively, MME 215 may facilitate the selection of a particular SGW 220 and/or a particular PGW 225 to serve traffic to and/or from UE 205. MME 215 may perform operations associated with handing off UE 205 from a first access point 210 to a second access point 210 when UE 205 is transitioning from a first cell associated with the first access point 210 to a second cell associated with the second access point 210. Additionally, or alternatively, MME 215 may select another MME (not pictured), to which UE 205 should be handed off (e.g., when UE 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more access points 210 associated with the LTE network, and may send the aggregated traffic to a network (e.g., via PGW 225) and/or other network devices associated with the EPC and/or the IMS core. SGW 220 may also receive traffic from a network and/or other network devices, and may send the received traffic to UE 205 via access point 210. Additionally, or alternatively, SGW 220 may perform operations associated with handing off UE 205 to and/or from an LTE network.

PGW 225 may include one or more devices capable of providing connectivity for UE 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to a network. Additionally, or alternatively, PGW 225 may receive traffic from a network, and may send the traffic to UE 205 via SGW 220 and access point 210. PGW 225 may record data usage information (e.g., byte usage), and may provide the data usage information to AAA 245.

MBMS-GW 230 may include one or more devices capable of routing packets for transmission via an eMBMS connection. For example, MBMS-GW 230 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. MBMS-GW 230 may also receive traffic from WLAN 255 and/or other network devices, and may send the received traffic to multiple UEs 205 via an eMBMS connection of access point 210.

BM-SC 235 may include one or more devices capable of managing an eMBMS connection. For example, BM-SC 235 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, BM-SC 235 may assign a channel of an eMBMS connection for transmitting network congestion information to a particular multicast broadcast single frequency network (e.g., an eMBMS connection associated with a particular geographic location).

Congestion notification device 240 may include one or more devices capable of receiving, generating, storing, processing, and/or providing network congestion information. For example, congestion notification device 240 may include a server device that receives network congestion information from access point 210 and/or provides the network congestion information to MBMS-GW 230 for transmission to UE 205 via access point 210 (e.g., via an eMBMS transmission). In some implementations, congestion notification device 240 corresponds to congestion notification device 115 shown in FIG. 1.

AAA 245 may include one or more devices, such as one or more server devices, that perform authentication, authorization, and/or accounting operations for communication sessions associated with UE 205. For example, AAA 245 may perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, etc.), may track resources consumed by UE 205 (e.g., a quantity of voice minutes consumed, a quantity of data consumed, etc.), and/or may perform similar operations.

HSS 250 may include one or more devices, such as one or more server devices, capable of managing (e.g., receiving, generating, storing, processing, and/or providing) information associated with UE 205. For example, HSS 250 may manage subscription information associated with UE 205, such as information that identifies a subscriber profile of a user associated with UE 205, information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HSS 250 may provide this information to one or more other devices of environment 200 to support the operations performed by those devices.

WLAN 255 may include a wireless network. For example, WLAN 255 may include a WLAN (e.g., a Wi-Fi network) and/or another type of network. WLAN 255 may include access point 210, which may provide network connectivity to WLAN 255 and/or another network, such as the Internet.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
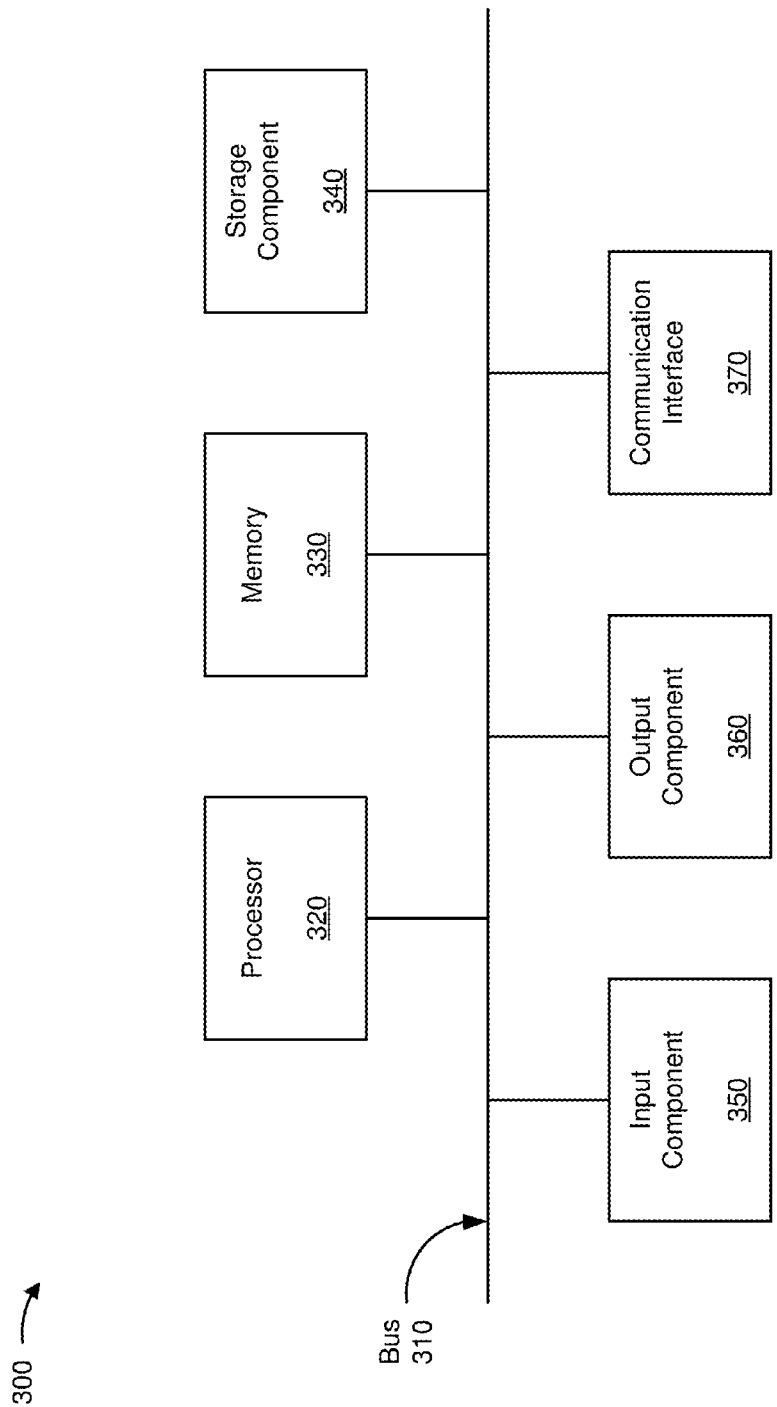
FIG. 3 is a diagram of example components of one or more devices of FIG. 2.

FIG. 3 is a diagram of example components of a device 300. Device 300 may correspond to UE 205, access point 210, MME 215, SGW 220, PGW 225, MBMS-GW 230, a BM-SC 235, congestion notification device 240, AAA 245, and/or HSS 250. In some implementations, UE 205, access point 210, MME 215, SGW 220, PGW 225, MBMS-GW 230, a BM-SC 235, congestion notification device 240, AAA 245, and/or HSS 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
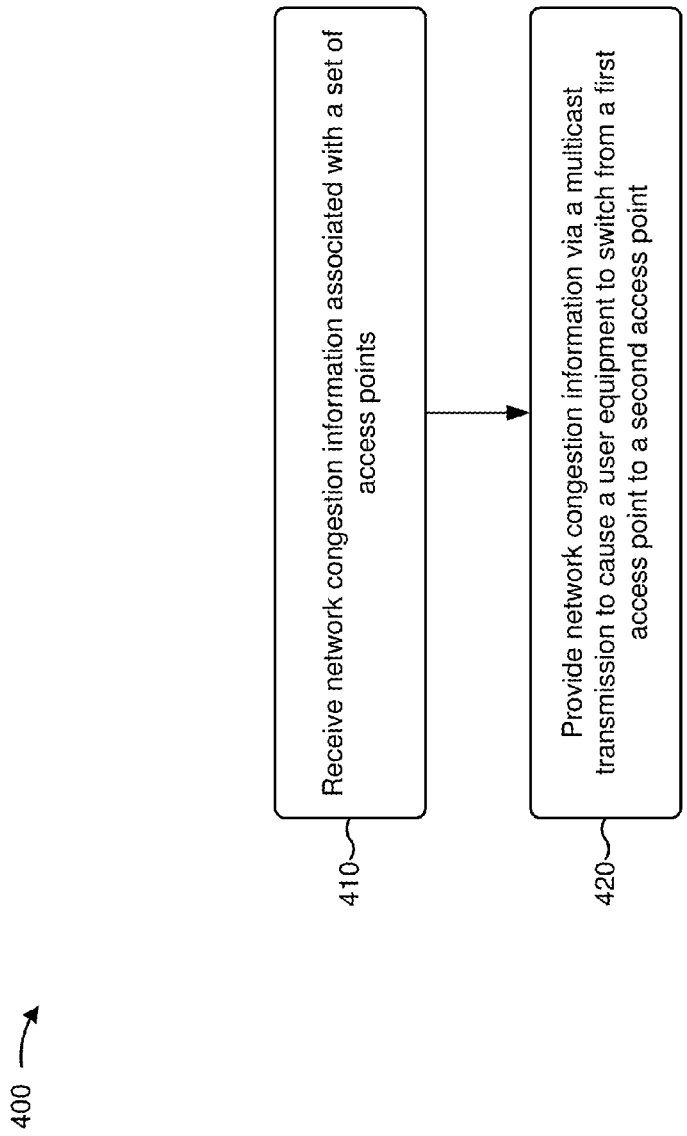
FIG. 4 is a flow chart of an example process for providing network congestion information to manage network congestion.

FIG. 4 is a flow chart of an example process 400 for providing network congestion information to manage network congestion. In some implementations, one or more process blocks of FIG. 4 may be performed by congestion notification device 240. In some implementations, one or more process blocks of FIG. 4 may be performed by another device or a group of devices separate from or including congestion notification device 240, such as UE 205, access point 210, MME 215, SGW 220, PGW 225, MBMS-GW 230, a BM-SC 235, AAA 245, and/or HSS 250.

As shown in FIG. 4, process 400 may include receiving network congestion information associated with a set of access points (block 410). For example, congestion notification device 240 may receive network congestion information associated with a set of access points 210. In some implementations, congestion notification device 240 may receive the network congestion information from a particular access point 210. For example, the particular access point 210 may provide network congestion information associated with a particular RAT (e.g., LTE, 3G, WLAN, etc.), a particular frequency band, or the like. In some implementations, congestion notification device 240 may receive network congestion information, from a particular access point 210, regarding multiple frequency bands. For example, an LTE access point 210 may provide, to congestion notification device 240, network congestion information regarding a first LTE frequency band and a second LTE frequency band, each of which LTE access point 210 utilizes to provide network connectivity to UE 205.

In some implementations, congestion notification device 240 may receive information identifying one or more metrics associated with network congestion when receiving the network congestion information. The network congestion metrics may include a measure of utilization of a particular frequency band (e.g., averaged across a particular time interval, such as on a per minute basis, a per second basis, etc.), a quantity of UEs 205 utilizing access point 210, or the like. For example, congestion notification device 240 may receive information identifying a quantity of channels that are assigned by access point 210 for utilization.

As further shown in FIG. 4, process 400 may include providing network congestion information via a multicast transmission to cause a user equipment to switch from a first connection to a second connection (block 420). For example, congestion notification device 240 may provide the network congestion information via a multicast transmission (e.g., an eMBMS transmission) to cause UE 205 to switch from a first connection to a second connection. In some implementations, congestion notification device 240 may provide the network congestion information based on a threshold period of time elapsing. For example, congestion notification device 240 may determine that a threshold period of time has elapsed from providing first network congestion information (e.g., 1 minute, 10 minutes, or the like), and congestion notification device 240 may provide second congestion information based on determining that the threshold period of time has elapsed. Additionally, or alternatively, congestion notification device 240 may provide the network congestion information based on determining a threshold change to a particular metric. For example, congestion notification device 240 may determine that a quantity of UEs 205 utilizing access point 210 has increased by a threshold quantity, and may determine to provide the network congestion information to identify the increase by the threshold quantity.

In some implementations, congestion notification device 240 may aggregate network congestion information received from multiple access points 210 and/or received via multiple messages for the multicast transmission. For example, congestion notification device 240 may receive first network congestion information from first access point 210 and second network congestion information from second access point 210, and may aggregate the first network congestion information and the second network congestion information into aggregated network congestion information for transmission to UE 205. In this case, congestion notification device 240 may provide the aggregated network congestion information via the multicast transmission. Additionally, or alternatively, congestion notification device 240 may receive first network congestion information from a particular access point 210 and subsequently receive second network congestion information from the particular access point 210. In this case, congestion notification device 240 may aggregate the first network congestion information and the second network congestion information into aggregated network congestion information for transmission to UE 205.

In some implementations, congestion notification device 240 may select a portion of network congestion information for transmission to UE 205. For example, congestion notification device 240 may select a portion of network congestion information that is determined to pertain to a set of UEs 205. In some implementations, congestion notification device 240 may determine that the portion of network congestion information pertains to the set of UEs 205 to which congestion notification device 240 is to provide the portion of network congestion information. For example, congestion notification device 240 may identify a geographic location from which the network congestion information is to be multicast and a set of access points 210 within a threshold proximity of the geographic location (e.g., access points 210 to which a UE 205 within the threshold proximity can connect). In this case, congestion notification device 240 may provide a portion of network congestion information pertaining to the set of access points 210. In this way, congestion notification device 240 ensures that provided network congestion information is associated with access points 210 to which a particular UE 205 that receives the provided network congestion information can connect.

Additionally, or alternatively, congestion notification device 240 may process received network congestion information before providing processed network congestion information. For example, congestion notification device 240 may assign a respective weight to a first utilization of access point 210 and to a second utilization of access point 210 to determine a predicted utilization of access point 210, and may provide information identifying the predicted utilization. In this way, congestion notification device 240 provides network congestion information that UE 205 can utilize to determine to which access point 210 to connect.

In some implementations, congestion notification device 240 may provide the network congestion information to cause an adjustment of UE 205. For example, congestion notification device 240 may provide particular network congestion information that causes UE 205 to handover from a first access point 210 to a second access point 210, from a first frequency band of access point 210 to a second frequency band of access point 210, or the like, as described herein with regard to FIG. 5.

In this way, congestion notification device 240 causes UE 205 to switch from a first access point 210 to a second access point 210 and/or from a first frequency band to a second frequency band, thereby facilitating network load balancing and reducing network congestion relative to UE 205 remaining connected to the first access point 210 and/or utilizing the first frequency band. Moreover, based on load balancing and/or reducing network congestion, congestion notification device 240 reduces a likelihood that UE 205 experiences an interruption in network connectivity, thereby causing an interruption to reception of eMBMS content.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
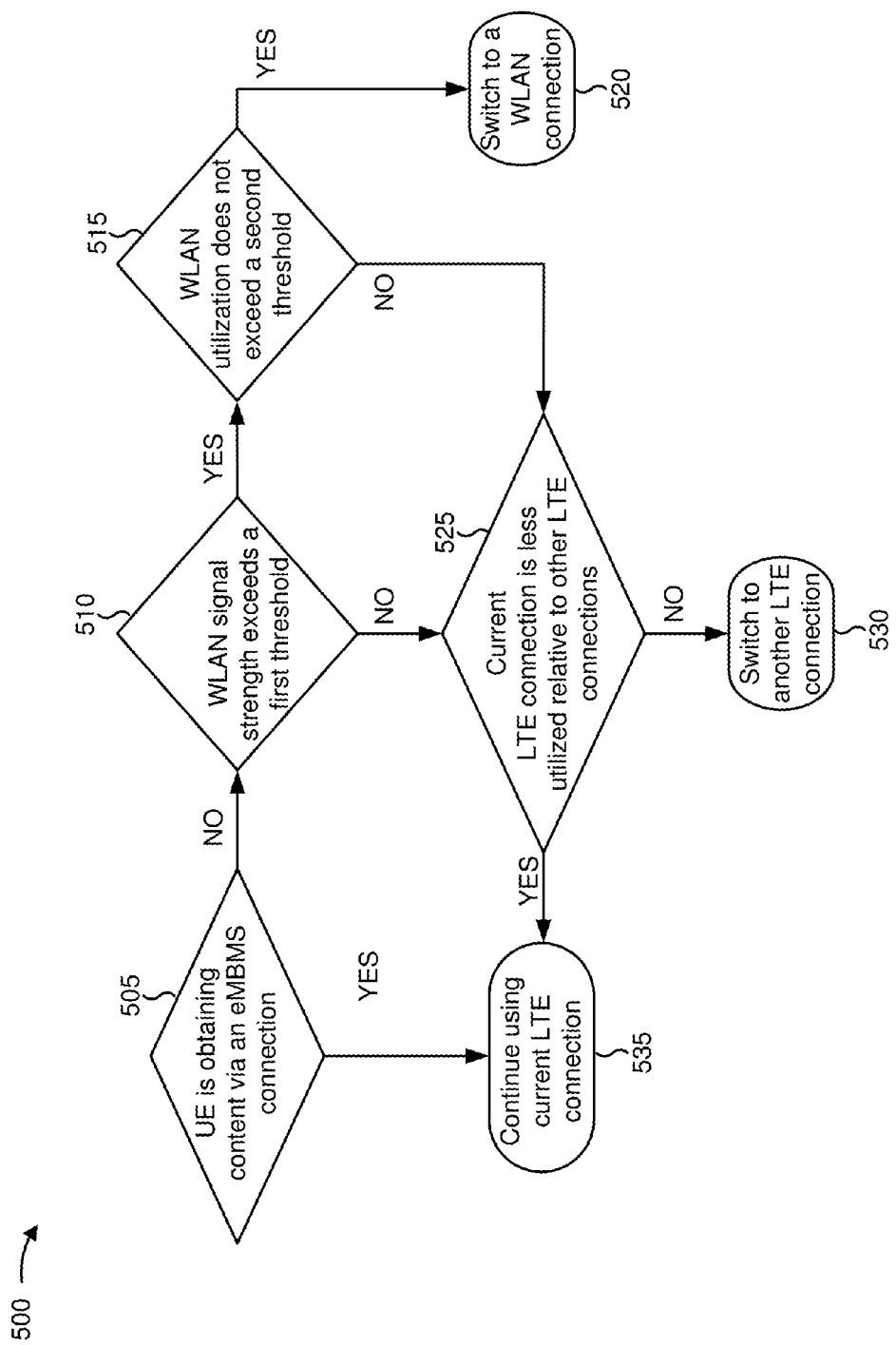
FIG. 5 is a flow chart of an example process for utilizing provided network congestion information to select a connection with which to access a network.

FIG. 5 is a flow chart of an example process 500 for utilizing provided network congestion information to select a connection with which to access a network. In some implementations, one or more process blocks of FIG. 5 may be performed by UE 205. In some implementations, one or more process blocks of FIG. 5 may be performed by another device or a group of devices separate from or including UE 205, such as access point 210, MME 215, SGW 220, PGW 225, MBMS-GW 230, a BM-SC 235, congestion notification device 240, AAA 245, and/or HSS 250.

As shown in FIG. 5, process 500 may include determining whether a UE is obtaining content via an eMBMS connection (block 505). For example, based on receiving network congestion information from congestion notification device 240 via an eMBMS connection, UE 205 may determine whether UE 205 is obtaining content via the eMBMS connection. For example, UE 205 may be utilizing the eMBMS connection to receive the network congestion information and to receive content, such as streaming video, streaming audio, or the like. Alternatively, UE 205 may be utilizing the eMBMS connection to receive the network congestion information and not to receive content.

As further shown in FIG. 5, if the UE is not obtaining content via the eMBMS connection (block 505—NO), process 500 may include determining whether a WLAN signal strength exceeds a first threshold (block 510). For example, UE 205 may determine that UE 205 is not obtaining content via the eMBMS connection, and may determine whether the WLAN signal strength exceeds the first threshold (e.g., a signal strength threshold). In some implementations, UE 205 may perform a WLAN signal strength measurement. For example, UE 205 may activate an antenna to determine a signal strength of a WLAN signal associated with a WLAN access point 210 (e.g., a Wi-Fi access point 210).

In some implementations, UE 205 may fail to detect a WLAN signal. For example, UE 205 may perform the WLAN signal strength measurement, and may fail to detect a WLAN signal on one or more frequency bands allocated for WLAN utilization. In this case, UE 205 may determine that the WLAN signal strength fails to exceed the first threshold based on failing to detect a WLAN signal. In some implementations, UE 205 may detect multiple WLAN signals. For example, UE 205 may determine whether a signal strength for one or more of the multiple WLAN signals exceed the first threshold. In this case, UE 205 may determine that the WLAN signal strength exceeds the first threshold based on detecting one or more WLAN signals for which a respective signal strength exceeds the first threshold.

As further shown in FIG. 5, if the WLAN signal strength exceeds the threshold (block 510—YES), process 500 may include determining whether a WLAN utilization does not exceed a second threshold (block 515). For example, UE 205 may determine that the WLAN signal strength exceeds a signal strength threshold, and may determine whether the WLAN utilization exceeds a second threshold (e.g., a network resource utilization threshold). In some implementations, UE 205 may determine that the WLAN utilization does not exceed the second threshold based on the network congestion information. For example, UE 205 may determine, based on the network congestion information, that a quantity of connection resources assigned to one or more UEs 205 and associated with a WLAN connection does not exceed the second threshold. Additionally, or alternatively, UE 205 may determine, based on the network congestion information, that a quantity of UEs 205 utilizing the WLAN connection exceeds the second threshold.

As further shown in FIG. 5, if the WLAN utilization does not exceed the second threshold (block 515—YES), process 500 may include switching to a WLAN connection (block 520). For example, based on determining that the WLAN utilization does not exceed the second threshold, UE 205 may switch from a first connection with a first access point 210 to a second connection with a second access point 210 (e.g., a Wi-Fi access point 210). In this way, UE 205 connects to a network with a signal strength that exceeds a signal strength threshold and resource utilization that does not exceed a resource utilization threshold. Moreover, when UE 205 disconnects from an LTE connection to connect to a WLAN connection, UE 205 reduces a likelihood that UE 205 is disconnected from a connection and/or reduces a likelihood that another UE 205 is disconnected from an LTE connection based on reducing a quantity of UEs 205 utilizing the LTE connection.

In some implementations, UE 205 may select a particular WLAN connection of a set of WLAN connections. For example, UE 205 may determine that for a first WLAN connection and a second WLAN connection, respective WLAN signal strengths exceed a first threshold and respective WLAN utilizations do not exceed a second threshold. In this case, UE 205 may select the first WLAN connection or the second WLAN connection for utilization based on the respective WLAN signal strengths, the respective WLAN utilizations, or the like.

In some implementations, UE 205 may switch from a first access point 210 to a second access point 210. For example, when UE 205 is utilizing a first connection with first access point 210 (e.g., a Wi-Fi connection, an LTE connection, etc.), UE 205 may switch to a second connection (e.g., a Wi-Fi connection) with second access point 210. In some implementations, UE 205 may switch from a first connection with a particular access point 210 to a second connection with the particular access point 210. For example, UE 205 may switch from a first WLAN connection with access point 210 to a second WLAN connection with access point 210 based on the WLAN signal strength and WLAN utilization of the second connection.

As further shown in FIG. 5, if the WLAN signal strength does not exceed the first threshold (block 510—NO) or if the WLAN utilization exceeds the second threshold (block 515—NO), process 500 may include determining whether a current LTE connection is less utilized relative to other LTE connections (block 525). For example, based on UE 205 determining that the WLAN utilization exceeds the second threshold, UE 205 may determine whether the current LTE connection being utilized by UE 205 is associated with a lower utilization relative to the one or more other LTE connections. In this way, UE 205 may determine whether another LTE connection is associated with a greater quantity of allocatable network resources than the current LTE connection, thereby facilitating load balancing of the current LTE connection and the other LTE connection. Similarly, based on UE 205 determining that the WLAN signal strength does not exceed the first threshold, UE 205 may determine whether another LTE connection is associated with a greater quantity of allocatable network resources than the current LTE connection.

As further shown in FIG. 5, if the current LTE connection is not less utilized relative to another LTE connection (block 525—NO), process 500 may include switching to another LTE connection (block 530). For example, based on UE 205 determining that the current LTE connection is associated with a utilization greater than another LTE connection to which UE 205 may connect, UE 205 may switch to the other LTE connection. In some implementations, UE 205 may select the other LTE connection from a set of other LTE connections. For example, UE 205 may order the set of other LTE connections based on respective utilizations, and may select a particular LTE connection, of the set of other LTE connections, associated with the lowest utilization relative to the set of other LTE connections.

In some implementations, UE 205 may switch from a first access point 210 to a second access point 210. For example, UE 205 may determine to switch from the current LTE connection provided by first access point 210 to the other LTE connection provided by second access point 210. Additionally, or alternatively, UE 205 may switch from the current LTE connection provided by a particular access point 210 to the other LTE connection provided by the particular access point 210. In this way, UE 205 utilizes the network congestion information to facilitate load balancing for a network.

As further shown in FIG. 5, if the UE is obtaining content via the eMBMS connection (block 505—YES) and/or the current LTE connection is less utilized relative to other LTE connections (block 525—YES), process 500 may include continuing to use the current LTE connection (block 535). For example, based on UE 205 determining that UE 205 is obtaining eMBMS content, UE 205 may determine to continue utilizing the current LTE connection. In this way, UE 205 may avoid interruption of the eMBMS content and may reduce network utilization relative to switching to a unicast connection to receive the content. Additionally, or alternatively, based on UE 205 determining that the current LTE connection is less utilized relative to other LTE connections, UE 205 may determine to continue utilizing the current LTE connection. In this way, UE 205 may avoid switching to another LTE connection that is associated with fewer allocatable resources than the existing LTE connection, thereby maintaining load balancing for a network.

In this way, UE 205 utilizes the network congestion information received from congestion notification device 240 to selectively load balance a network by selectively switching between different connections (e.g., an LTE eMBMS connection, an LTE unicast connection, a WLAN connection, or the like), thereby improving network performance.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive network congestion information relating to one or more connections,
the network congestion information identifying respective utilizations of the one or more connections, and
the one or more connections being associated with one or more access points of a network;
determine a set of user equipment (UEs), of a plurality of UEs, to receive a portion of the network congestion information,
the portion of the network congestion information including less information than the network congestion information,
the set of UEs including less UEs than the plurality of UEs,
the portion of the network congestion information being applicable to the set of UEs based on a geographic location of the set of UEs, and
a different set of UEs, of the plurality of UEs, receiving a different portion of the network congestion information based on a different geographic location of the different set of UEs; and
cause the portion of the network congestion information to be provided to the set of UEs, via a multicast transmission, to cause the set of UEs to switch from a first connection, of the one or more connections, to a second connection, of the one or more connections, based on the portion of the network congestion information,
the plurality of UEs being connected to the network via a multicast connection,
the portion of the network congestion information to be provided to the set of UEs via the multicast transmission from the geographic location, at least one access point, of the one or more access points, within a threshold proximity of the geographic location being in communication with the set of UEs.

2. The device of claim 1, where the first connection is associated with a first access point, of the one or more access points, and the second connection is associated with a second access point of the at least one access point,
the first access point being different from the second access point.

3. The device of claim 1, where the first connection and the second connection are associated with a same access point of the one or more access points.

4. The device of claim 1, where the multicast transmission is an evolved multimedia broadcast multicast service transmission.

5. The device of claim 1, where the network congestion information is aggregated network congestion information; and
where the one or more processors are further to:
receive the portion of the network congestion information, the portion of the network congestion information being associated with a first access point, of the one or more access points, and the different portion of the network congestion information, the different portion of the network congestion information being associated with a second access point of the one or more access points;
aggregate the portion of the network congestion information and the different portion of the network congestion information into the aggregated network congestion information; and
cause the aggregated network congestion information to be provided.

6. The device of claim 1, where the geographic location is a first geographic location associated with a first access point of the one or more access points; and
where the one or more processors are further to:
determine a second geographic location associated with a second access point of the one or more access points,
the second access point being associated with providing the multicast transmission;
determine that the first geographic location is located within the threshold proximity of the second geographic location;
select the network congestion information for transmission based on determining that the first geographic location is located within the threshold proximity of the second geographic location; and
cause the selected network congestion information to be provided based on selecting the network congestion information.

7. The device of claim 1, where the multicast transmission is provided via the multicast connection,
the multicast connection being utilized to provide streaming audio content or streaming video content to the plurality of UEs.

8. A computer-readable medium storing instructions, the instructions comprising:
one or more instructions that, when executed by one or more processors, cause the one or more processors to:
receive network congestion information relating to one or more connections,
the network congestion information identifying respective utilizations of the one or more connections, and
the one or more connections being associated with one or more access points of a network;
determine a set of user equipment (UEs), of a plurality of UEs, to receive a portion of the network congestion information,
the portion of the network congestion information including less information than the network congestion information,
the set of UEs including less UEs than the plurality of UEs,
the portion of the network congestion information being applicable to the set of UEs based on a geographic location of the set of UEs, and
a different set of UEs, of the plurality of UEs, receiving a different portion of the network congestion information based on a different geographic location of the different set of UEs; and
cause the portion of the network congestion information to be provided to the set of UEs, via a multicast transmission to cause the set of UEs to switch from a first connection, of the one or more connections, to a second connection, of the one or more connections, based on the portion of the network congestion information and without interrupting a multicast connection used by the plurality of UEs,
the plurality of UEs being connected to the network via the multicast connection
the portion of the network congestion information to be provided to the set of UEs via the multicast transmission from the geographic location,
at least one access point, of the one or more access points, within a threshold proximity of the geographic location being in communication with the set of UEs.

9. The computer-readable medium of claim 8, where the first connection is associated with a first access point, of the one or more access points, and the second connection is associated with a second access point of the at least one access point,
the first access point being different from the second access point.

10. The computer-readable medium of claim 8, where the first connection and the second connection are associated with a same access point of the one or more access points.

11. The computer-readable medium of claim 8, where the multicast transmission is an evolved multimedia broadcast multicast service transmission.

12. The computer-readable medium of claim 8, where the network congestion information is aggregated network congestion information; and
where the one or more instructions, when executed by the one or more processors, further cause the one or more processors to:
receive the portion of the network congestion information, the portion of the network congestion information being associated with a first access point, of the one or more access points, and the different portion of the network congestion information, the different portion of the network congestion information being associated with a second access point of the one or more access points;
aggregate the portion of the network congestion information and the different portion of the network congestion information into the aggregated network congestion information; and
cause the aggregated network congestion information to be provided.

13. The computer-readable medium of claim 8, where the geographic location is a first geographic location associated with a first access point of the one or more access points; and
where the one or more instructions, when executed by the one or more processors, further cause the one or more processors to:
determine a second geographic location associated with a second access point of the one or more access points,
the second access point being associated with providing the multicast transmission;
determine that the first geographic location is located within the threshold proximity of the second geographic location;
select the network congestion information for transmission based on determining that the first geographic location is located within the threshold proximity of the second geographic location; and
cause the selected network congestion information to be provided based on selecting the network congestion information.

14. The computer-readable medium of claim 8, where the multicast transmission is provided via the multicast connection,
the multicast connection being utilized to provide streaming content to the plurality of UEs.

15. A method, comprising:
receiving, by a device, network congestion information relating to one or more connections,
the network congestion information identifying respective utilizations of the one or more connections, and
the one or more connections being associated with one or more access points of a network;
determining, by the device, a set of user equipment (UEs), of a plurality of UEs, to receive a portion of the network congestion information,
the portion of the network congestion information including less information than the network congestion information,
the set of UEs including less UEs than the plurality of UEs,
the portion of the network congestion information being applicable to the set of UEs based on a geographic location of the set of UEs, and
a different set of UEs, of the plurality of UEs, receiving a different portion of the network congestion information based on a different geographic location of the different set of UEs; and
causing, by the device, the portion of the network congestion information to be provided to the set of UEs, via a multicast transmission, to cause the set of UEs to switch from a first connection, of the one or more connections, to a second connection, of the one or more connections, based on the portion of the network congestion information, the portion of the network congestion information to be provided to the set of UEs via the multicast transmission from the geographic location, at least one access point, of the one or more access points, within a threshold proximity of the geographic location being in communication with the set of UEs.

16. The method of claim 15, where the first connection is associated with a first access point, of the one or more access points, and the second connection is associated with a second access point of the one or more access points, the first access point being different from the second access point.

17. The method of claim 15, where the first connection and the second connection are associated with a same access point of the one or more access points.

18. The method of claim 15, further comprising:

determining a first resource utilization associated with the first connection and a second resource utilization associated with the second connection; and causing the set of UEs to switch from the first connection to the second connection based on the first resource utilization and the second resource utilization.

19. The method of claim 15, further comprising:

determining a first signal strength associated with the first connection and a second signal strength associated with the second connection; and causing the set of UEs to switch from the first connection to the second connection based on the first signal strength and the second signal strength.

20. The method of claim 15, where the multicast transmission is received via a multicast connection, the multicast connection being utilized to receive streaming audio content or streaming video content.

* * * * *